United States Patent
Macken et al.

(10) Patent No.: US 7,102,853 B2
(45) Date of Patent: Sep. 5, 2006

(54) NEGATIVE THERMAL EXPANSION DIELECTRICS FOR THERMAL POLE TIP PROTRUSION COMPENSATION

(75) Inventors: Declan Macken, Prior Lake, MN (US); Jeremy Adam Thurn, Eagan, MN (US); Mallika Kamarajugadda, Edina, MN (US); Michael Christopher Kautzky, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 276 days.

(21) Appl. No.: 10/607,894

(22) Filed: Jun. 27, 2003

(65) Prior Publication Data

US 2004/0075944 A1  Apr. 22, 2004

Related U.S. Application Data

(60) Provisional application No. 60/419,924, filed on Oct. 21, 2002.

(51) Int. Cl.
  *G11B 5/31* (2006.01)
  *G11B 5/39* (2006.01)
  *G11B 5/17* (2006.01)

(52) U.S. Cl. .................. 360/126; 360/123; 360/317; 360/320

(58) Field of Classification Search ................ 360/126, 360/123, 317, 320
See application file for complete search history.

(56) References Cited

U.S. PATENT DOCUMENTS

| 4,905,110 | A | 2/1990 | Krum et al. |
|---|---|---|---|
| 5,185,681 | A | 2/1993 | Volz et al. |
| 5,262,911 | A | 11/1993 | Cain et al. |
| 5,514,360 | A | 5/1996 | Sleight et al. |
| 5,596,461 | A | 1/1997 | Stefansky |
| 5,668,689 | A | 9/1997 | Schultz et al. |
| 5,943,189 | A | 8/1999 | Boutaghou et al. |
| 6,134,076 | A | 10/2000 | Boutaghou et al. |
| 6,289,564 | B1 | 9/2001 | Novotny |
| 6,445,541 | B1 | 9/2002 | Boutaghou et al. |
| 6,567,239 | B1 | 5/2003 | Hasegawa et al. |
| 6,909,578 | B1 * | 6/2005 | Missell et al. .............. 360/126 |
| 2003/0090834 | A1 | 5/2003 | Kamarajugadda et al. |

OTHER PUBLICATIONS

Auciello, Orlando et al. "Annual Review of Materials Science." vol. 28, 1998.

Sutton, Michael S. and Talghader, Joseph. "Micromachined Negative Thermal Expansion Thin Films." Department of Electrical and Computer Engineering, University of Minnesota, 2002.

Kofteros, M. et al. "A preliminary study of thermal expansion compensation in cement by $ZrW_2O_8$ additions." Department of Civil Engineering, The University of Texas at El Paso. Dec. 5, 2000, pp. 369-374.

Martinek, Charles A. et al. "Subsolidus Equilibria in the System," *Journal of the American Ceramic Society, Ceramic Abstracts*. Mar. 1970. vol. 53, No. 3, pp. 159-161.

Martinek, Charles et al. "Linear Thermal Expansion of Three Tungstates," *Journal of the American Ceramic Society, Ceramic Abstracts*. Apr. 1968. vol. 51, No. 4, pp. 227-228.

(Continued)

*Primary Examiner*—Craig A. Renner (57) ABSTRACT

A slider having a magnetic read/write head and including, a base coat, a reader element having a transducer, a writer element, the writer element including at least one conductive coil, the coil being electrically insulated by a composition which has a negative coefficient of thermal expansion, and an overcoat.

42 Claims, 7 Drawing Sheets

OTHER PUBLICATIONS

Ernst, G. et al. "Phonon density of states and negative thermal expansion in $ZrW_2O_8$" NATURE, Nov. 12, 1998, vol. 396, issue no 6707 pp. 147-149.

Graham, J. et al. "A New Ternary Oxide, $ZrW_2O_8$." *Journal of the American Ceramic Society, Ceramic Abstracts*. Nov. 1959. vol. 42, No. 11, p. 570.

Mary, T.A., et al. "Negative Thermal Expansion from 0.3 to 1050 Kelvin in $ZrW_2O_8$." SCIENCE. Apr. 5, 1996, vol. 272, No. 5258. pp. 90-92.

Chang, Luke L. Y. et al. "Condensed Phase Relations in the Systems $ZrO_2$-$WO_2$-$WO_3$ and $HfO_2$-$WO_2$-$WO_3$." *Journal of the American Ceramic Society, Ceramic Abstracts*. Apr. 1967, vol. 50, No. 4, pp. 211-215.

Holzer, Hermann, et al. "Phase transformation and thermal expansion of $CU/ZrW_2O_8$ metal matrix composites." Journal of Materials Research. vol. 14, No. 3, Mar. 1999, pp. 780-789.

US 5,140,481, 08/1992, Cain et al. (withdrawn)

\* cited by examiner

NEGATIVE THERMAL EXPANSION DIELECTRICS FOR THERMAL POLE TIP PROTRUSION COMPENSATION

CROSS REFERENCE TO RELATED APPLICATIONS

This application claims the benefit of U.S. Provisional Application No. 60/419,924, filed Oct. 21, 2002, which is incorporated herein by reference.

FIELD OF THE INVENTION

The invention relates generally to computer disk drive technology. More specifically, the invention relates to materials, useful in the disk drive, which exhibit negative thermal expansion.

BACKGROUND OF THE INVENTION

Computer disk drive technology has experienced tremendous advances in certain economies of scale, such as size, data compression and data density. In particular, areal density, the density of data on a hard disk drive, has increased geometrically over the last several years. In turn, the tolerances of disk drive components and their relationship to one another has also become a concern. For example, reading from, or writing to, a hard drive having a higher areal density requires close proximity between the transducer containing head and the media. With this closer proximity between head and media, comes a correlative need for the relationship between the head and media to be more regular and predictable during operation.

Complicating these concerns is that the load beams and slider may be made from any number of materials such as metals, polymers or composites all having differing and sometimes marginally compatible physical properties. The environment of use is also a concern. The load beams and slider are also the subject of high thermal stress. These components are commonly subjected to the isothermal heating generated by the various components working in the disk drive. Even more severe, the read/write head of the slider is often characterized as being the hottest part of the assembly. The read/write head is subject to the isothermal heating originating from the other disk drive components. Even further, the read/write head is subjected to joule heating induced thermal stress by the electrical work completed by the transducers in the portion of the slider.

As can be appreciated, the increase or decrease in thermal energy may have any number of effects on the materials used to fabricate the slider. These materials may expand, to different and varying degrees, when heated. In the meantime, the expansion of various elements of the read/write head may result in protrusions from the head adversely affecting fly height between the head and the media. Fly height naturally has to be of such magnitude so that elements of the head do not touch, dig, scrape, or otherwise interfere with the media.

One area of ongoing concern is the writer core on the head. The writer core is generally characterized by coils which carry current flow and, in turn, generate magnetic flux. The heat build up in this area of the head can be considerable. In the past, two general classes of materials have been used to insulate the coils. The first class of materials is commercially available, thermoset polymers. For example, U.S. Pat. No. 6,567,239 discloses liquid resist polymers used to isolate and insulate adjacent conductive lines of a coil pattern.

Thermosetting polymeric compositions are generally characterized by a high coefficient of thermal expansion and a low Young's modulus. Thus while these polymers may create irregular expanded volumes on the head, the expansion may often be mitigated. Another material used in the past is alumina which has a high dielectric character, a moderate coefficient of thermal expansion, but a high Young's modulus. Thus, while alumina does not expand to the same degree as a thermoset, the expansion, once evident, is more difficult to mitigate.

As can be seen, there is a need for further refinements in head materials and design which will allow for lower fly heights and greater areal density on media.

SUMMARY OF THE INVENTION

In accordance with a first embodiment of the invention, there is provided a magnetic head comprising a bottom pole, a writer element, the writer element comprising at least one conductive coil, the coil being electrically insulated by a composition which has a negative coefficient of thermal expansion, and an insulating layer covering at least a portion of the insulating composition.

In accordance with a second embodiment of the invention, there is provided a slider having a magnetic read/write head, the magnetic read/write head comprising a base coat, a reader element comprising a transducer, a writer element, the writer element comprising at least one conductive coil, the coil being electrically insulated by a composition which has a negative coefficient of thermal expansion, and an overcoat.

In accordance with a further embodiment of the invention, there is provided a slider having a magnetic head, the magnetic head comprising a reader element comprising a transducer, a writer element comprising at least one conductive coil, and at least one insulating element, the insulating element comprising a composition having a negative coefficient of thermal expansion.

One aspect of the continuous increase of areal density is that the distance between the transducer and the media needs to be reduced by a decrease in the sensor fly height. Thermal induced pole tip protrusion is often a significant fraction of the spacing between the read/write head and the recording media. Much of the thermal pole tip protrusion originates from the metal layers exposed at the air-bearing surface adjacent the recording media.

By introducing ceramics into the read/write head structure it is possible to compensate for the thermal expansion of the metallic layers. Ceramics having a negative thermal expansion allow this to be achieved with less material introduced. In addition, to avoid the need for engineering the crystallographic texture of the ceramics, a material that contracts isotropically is preferred. An example of ceramic materials displaying an isotropic negative coefficient of thermal expansion (CTE) is $ZrW_2O_8$. Areas of the head where this material can effectively be used are, for example, the basecoat, ceramic layers into which the shields are embedded and the ceramic used to isolate the coil turns from the writer yoke, among other areas.

Ceramic films may be deposited through several means. Vacuum evaporation of ceramic powder has already been demonstrated to yield films with a negative CTE, but this method is less suitable for thick films in high-volume manufacturing due to its low deposition rate. Sputter deposition is preferred using radio-frequency (RF) sputtering from a ceramic source target. Reactive sputtering from a ceramic target in an $Ar/O_2$ ambient may also be used. The former technique offers process simplicity but limited control of film stoichiometry and low deposition rates. The later technique has the advantages of high rate, more precise control of film stoichiometry, and higher long-term process control, particularly if active partial pressure control of the oxygen gas is employed. This is the preferred method of deposition of thick films needed for thermal pole tip recession applications since oxide deposition rates approaching 50–75% of the corresponding metal deposition rates may often be achieved.

DETAILED DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
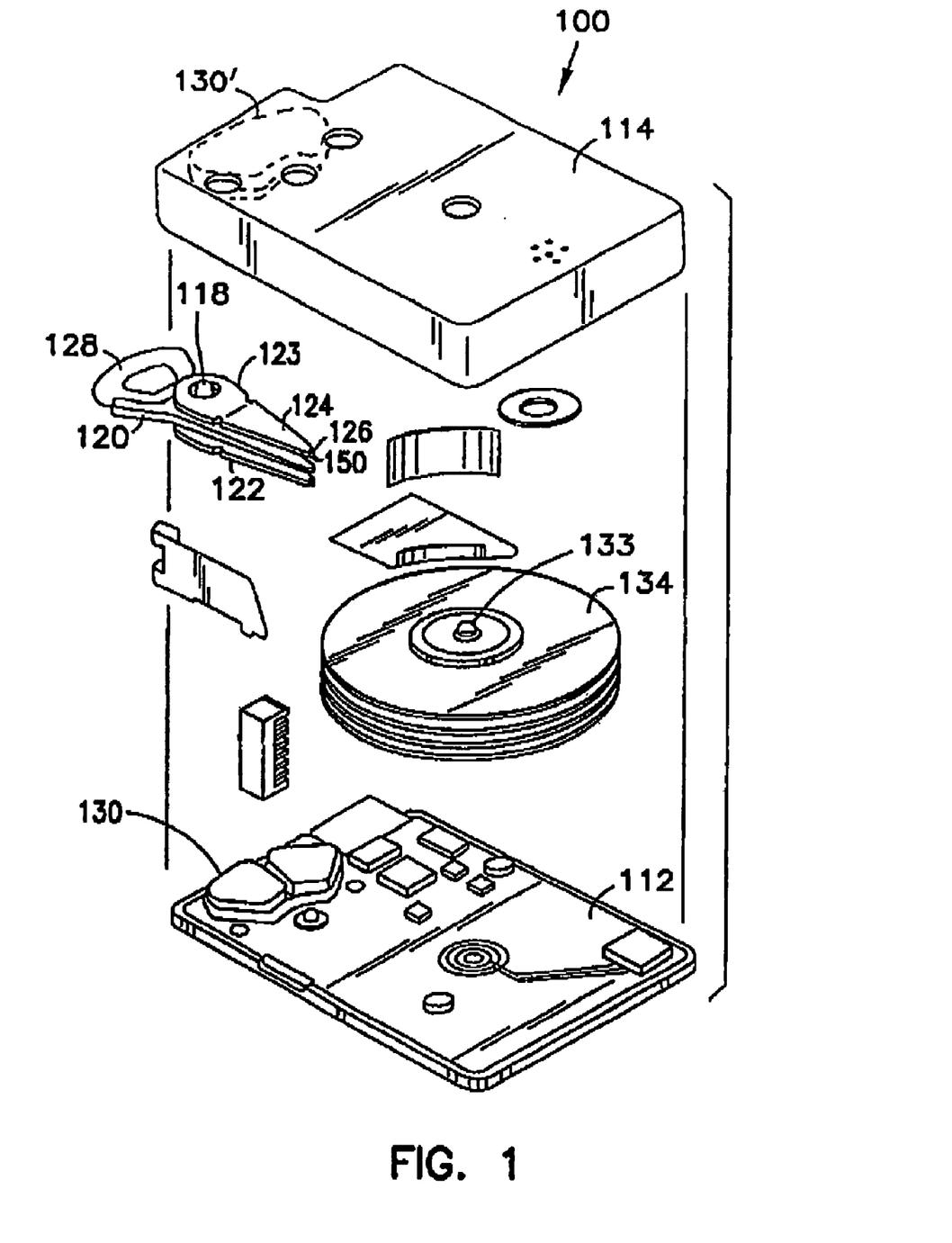
FIG. 1 is a perspective view of a disk drive.

The invention described in this application is useful with all mechanical configurations of disk drives having either rotary or linear actuation. In addition, the invention is also useful in all types of disk drives including hard disk drives, zip drives, and floppy disk drives, among others. FIG. 1 is an exploded view of one type of a disk drive 100 having a rotary actuator. The disk drive 100 includes a housing or base 112, and a cover 114. The base 112 and cover 114 form a disk enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150.

The slider 126 with the transducer 150 form what may be called the magnetic head. The invention is equally applicable to sliders having one transducer, or having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a pair of magnets 130 and 130'. The pair of prime magnets 130 and 130', and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disk drive, the spindle motor is within the hub. In FIG. 1, a number of disks 134 are attached to the spindle hub 133. In other disk drives a single disk or a different number of disks may be attached to the hub. The invention described herein is equally applicable to such other disk drives.

Figure 2:
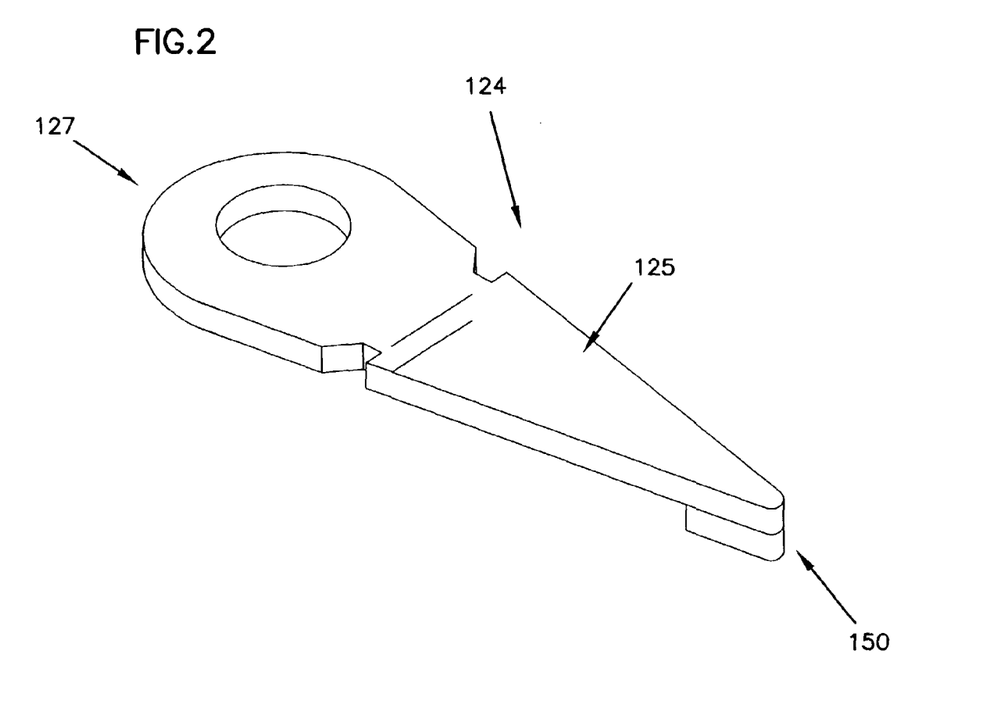
FIG. 2 is a perspective view of a slider assembly.

Referring to FIG. 2, each of the load springs 124 may be comprised of a swage plate (not shown), preferably stamped of sheet stainless steel, to which is spot welded an extensive leaf member 125, also stamped from sheet stainless steel. The transducers 150 are fixed to the undersides of the leaf members 125, as the leaf members have been illustrated in FIG. 2, in a conventional manner. The swage plates are located at one end of the leaf members 127 and the transducers 150 are located at the opposite end of the leaf members. When the load springs 124 are attached to the actuator body via the swage plates, the transducers 150 will be supported at a selected distance from the disk 134 or magnetic media.

Processing

As noted earlier, the invention is applicable to many different elements of the slider 50. One exemplary application includes the use of compositions having negative thermal expansion as the insulative material between the coils in the writer portion of the head. Any number of processes may be used in accordance with the invention. Representative, exemplary processes include those disclosed in the U.S. patent application Ser. No. 10/199,344 and U.S. Patent Application Publication No. US2003/0,090,834 A1, which is commonly assigned and incorporated herein by reference. Turning to FIGS. 3a through 3h, one exemplary fabrication process according to the invention is illustrated.

Figure 3A:
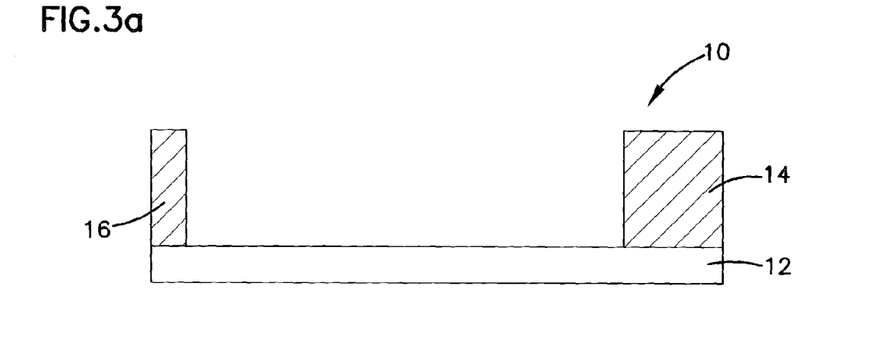
FIGS. 3a through 3h are side elevation views of various stages in processing and fabrication of a head stack in accordance with one aspect of the invention.

As can be seen in FIG. 3a, the upper shared pole 14 and shared pole extension 16 are deposited on the shared pole 12. These poles may be formed by electroplating into a patterned photoresist mask. Common materials for use in fabricating these poles includes metals such as alloys of cobalt, nickel, and iron. The shared pole 12 may be any number of metals such as alloys of cobalt, nickel or iron.

Figure 3B:
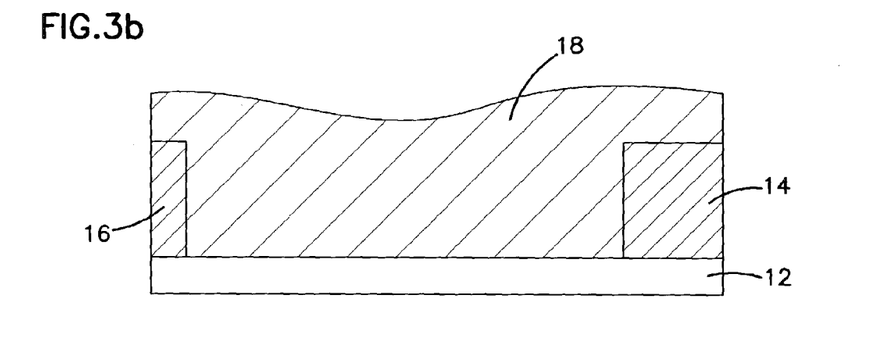
Figure 3C:
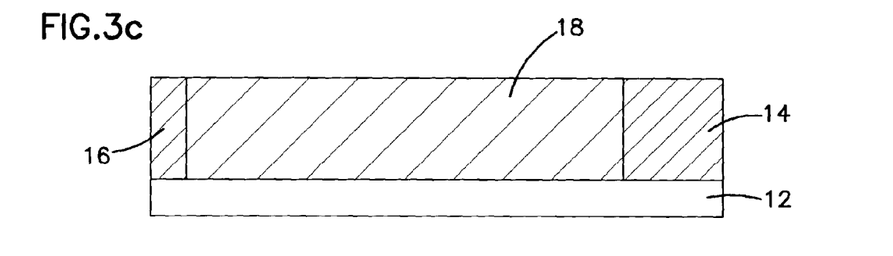

Once these two poles are formed, the ceramic 18 is then deposited between and over the two pole structures 14, 16, FIG. 3b. The ceramic may be deposited by any number of means such as RF sputtering, reactive sputtering or electron beam evaporation. For example, zirconium and tungsten may be sputtered in an oxygen plasma. The system may be heated during deposition in order to form the appropriate atomic phase within the material when using either evaporation or sputtering. The ceramic 18 may then be planarized by chemical/mechanical polishing processes, FIG. 3c. Generally, the ceramic is planarized to the height of the poles, preferably about 2 to 3 microns thick.

Figure 3D:
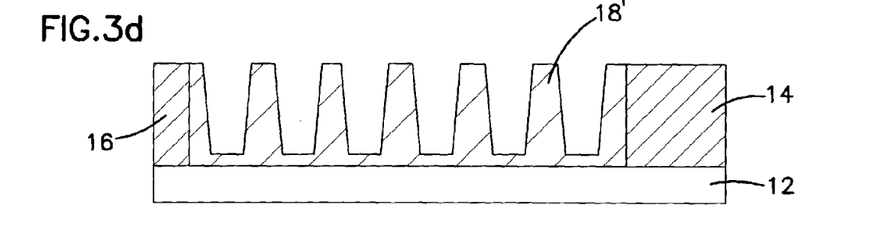

The coil insulator structure 18' may then be formed, FIG. 3d. Conventional etching, taking advantage of the shared pole 12, may be used to form structures having a natural trapezoidal shape 18'. Reactive ion etching may be used to form shapes which have a higher aspect ratio; a height of about 2 to 3 microns, spaced apart from each other by about 0.1 to 0.5 microns. Generally, the coil insulator structures 18' are about 1 to 2 microns wide.

Figure 3E:
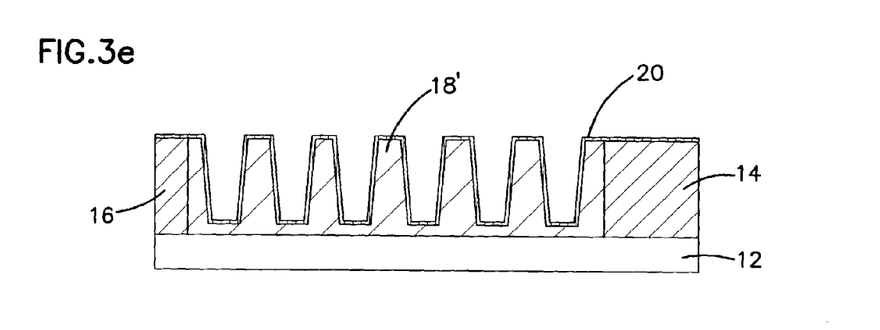

The coil seed 20 is then deposited by conventional means such as sputtering. Any number of conductive materials may be used such as copper, chrome, gold, platinum and nickel, among other materials to form the coil seed. One preferred material used to form the coil seed is a combination of chrome and copper with a chrome layer of about 0.03 microns applied first followed by a copper layer of about 0.1 micron.

Figure 3F:
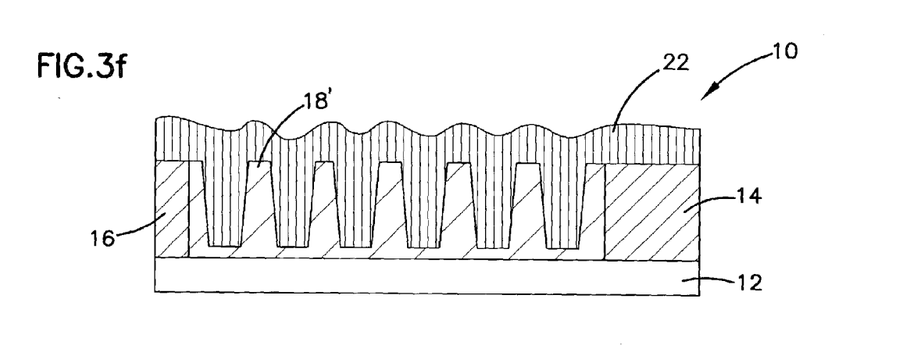
Figure 3G:
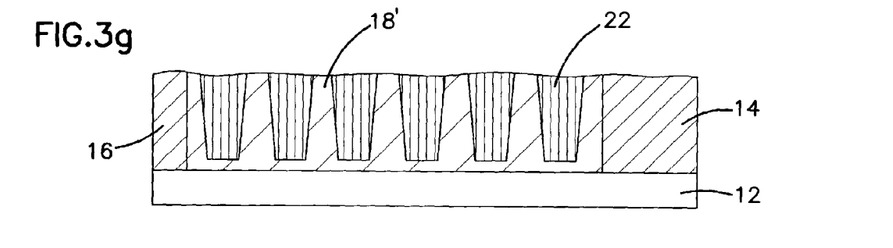
Figure 3H:
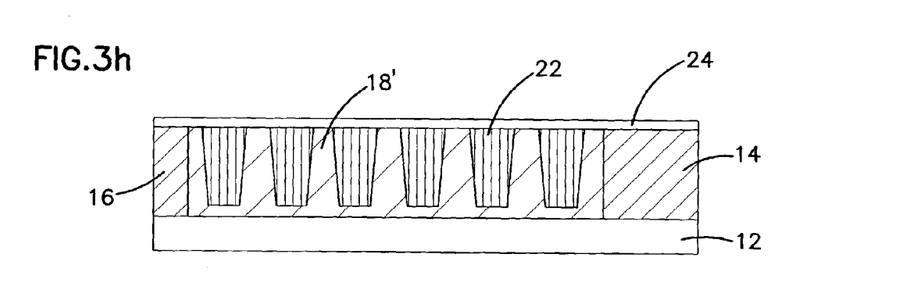

The writer core 10 may then be filled with copper 22, FIG. 3f. The copper fill may be completed by conventional means such as sputtering or electroplating. After deposition, the coil fill 22 is then planarized by conventional means such as chemical/mechanical polishing, FIG. 3g. An insulator layer 24 comprising, for example, $Al_2O_3$ or any other dielectric such as ceramic may then be deposited through conventional means. Generally, the thickness of the insulator layer ranges from about 0.05 to 0.15 microns and preferably about 0.09 microns.

Figure 4:
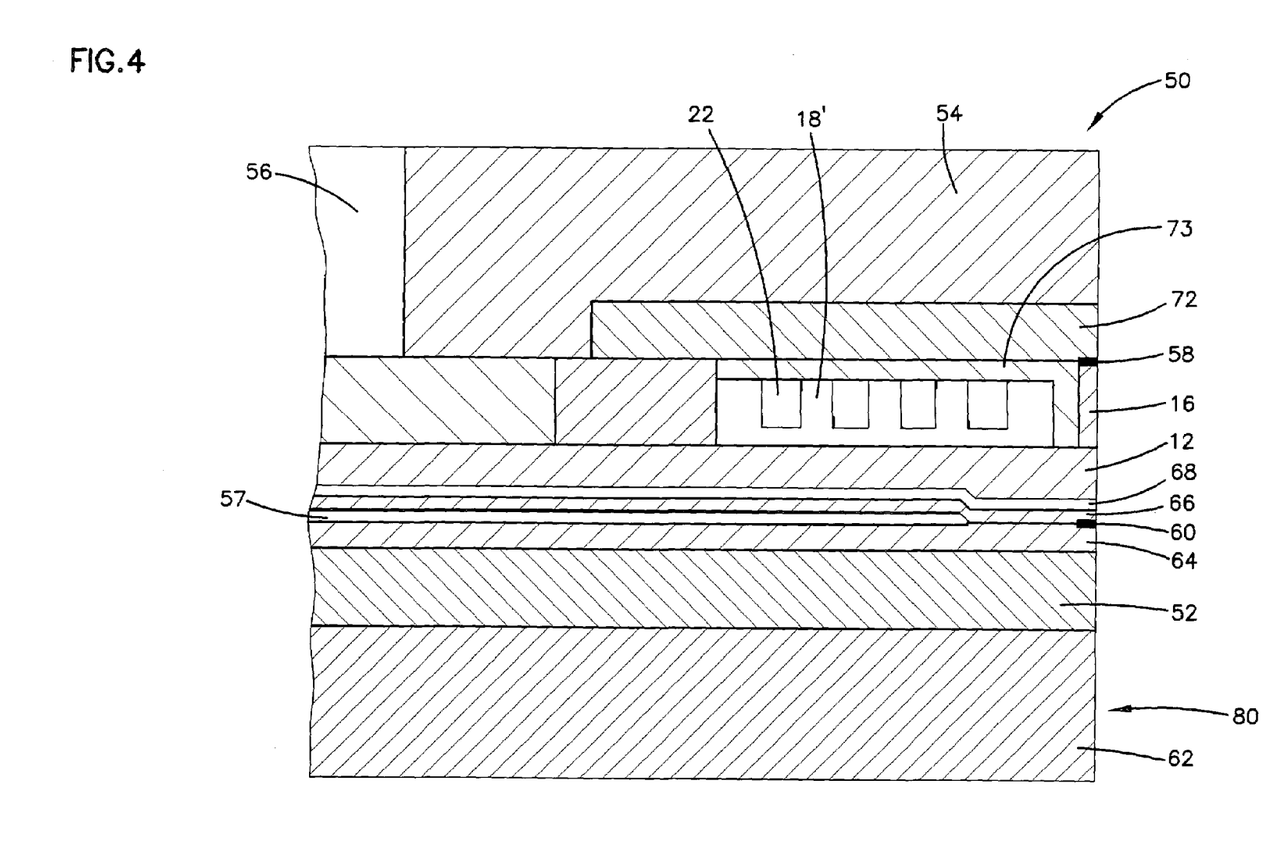
FIG. 4 is a side elevation view of a head stack fabricated in accordance with the invention.

FIG. 4 illustrates the components of the slider or magnetic head 50 adjacent the air bearing surface 80 including the coils 22, previously fabricated, (FIGS. 3a–3h). The base layer 62 is the substrate. The active elements of the head are surrounded by a base coat 52 and an overcoat 54 which serve to insulate and protect. The read transducer 60 is held between the bottom shield 64 and the top shield 66. The shared pole 12 is insulated from the top shield 66 by a spacer 68. In turn, the writer gap 58 is defined by the upper shared pole 16, insulative material 73 and top pole 72. The coils 22 are held within the insulative material 18' (earlier defined and filled, FIGS. 3a–3h). An electrical stud 56 is in contact (not shown) with a further contact 57 to provide electrical communication to the device 50. FIG. 4 is one illustrative embodiment of a magnetic head in accordance with the invention. Other head designs may also be used in accordance with the invention including those having the writer gap 58 beneath the reader transducer 60 and those heads having more than one set of coils or more than one writer yoke.

Generally, negative thermal expanding material may be used for any element of the device which requires a dielectric or insulative material, such as the base coat or overcoat. Further, other head designs may also be used with the invention. For example, the configuration of reader and writer may be reversed as seen in U.S. Pat. No. 5,668,689 which is incorporated herein by referenced.

Any variety of materials may be used to insulate the coils according to the invention including single crystalline, polycrystalline, and amorphous materials. Polycrystalline materials are generally useful and ceramics are preferred. Any number of ceramics may be used in accordance with the invention. The ceramics may be isotropic or anisotropic. Isotropic materials are most preferred as they contract uniformly upon heating. Anisotropic ceramics are also useful. However, these materials may need to be crystallographically textured to ensure that, upon heating, the ceramic responds as intended. Exemplary ceramics useful in the invention include ternary and quaternary ceramics of aluminum, barium, bismuth, boron, hafnium, manganese, magnesium, gadolinium, lanthanum, lead, zirconium, copper, yttrium, strontium, zinc, tungsten, thallium, iron, nitrogen, and oxygen, among others.

Most useful are ceramics which exhibit negative expansion when subjected to temperatures above ambient. Preferred ceramics exhibiting negative thermal expansion above ambient include those comprising zirconium, hafnium, molybdenum, tungsten, and vanadium among others. Representative of those preferred ceramics are $ZrW_2O_8$, $HfW_2O_8$, $ZrV_2O_7$, cubic $ZrMo_2O_8$, Mo substituted $ZrW_2O_8$, and mixtures thereof. Also useful are suitably crystallographically textured anisotropic materials such as vanadium doped $ZrP_2O_7$, and $NaZr_2P_3O_{12}$, among others.

Also useful are ceramics such as $ZrV_{(2-x)}P_xO_7$, $ThP_2O_7$ $UP_2O_7$, $HfV_2O_7$, $ZrV_2O_7$, $ZrW_2O_8$, $HfW_2O_8$, $ZrW_{(2-x)}M_xO_8 (x<=1.5)$, $Zr_2PW_2O_{12}$, $Sc_2(WO_4)_3$, $Sc_2(MoO_4)_3$, $Cr_2(MoO_4)_3$, $Fe_2(MoO_4)_3$, $Al_2(MoO_4)_3$, and $A_2(MoO_4)_3$ where in A can be $Fe^{+3}$, $Cr^{+3}$, or $Al^{+3}$. Probably the most preferred ceramic is $ZrW_2O_8$ which exhibits a negative coefficient of thermal expansion in three different phases: alpha (−8.7 ppm/° C.); beta (−4.8 ppm/° C.); and gamma (−1 ppm/° C.).

Generally ceramics having the following parameters are useful:

Coefficient of Thermal Expansion: 0 to −15
Young's Modulus: 50 to 500

In practice, the invention is applicable to any number of elements within the slider. For example, materials with a negative coefficient of thermal expansion such as ceramics may be positioned adjacent the coils and used above, below, between, or outside of the coils. Materials in accordance with the invention may be used as a portion of or as the entirety of the base coat or overcoat. Materials in accordance with the invention may also be used to form any layer of the reader or writer elements or as any patterned dielectric or insulative film in any component of the slider including as a field oxide or a patterned film within the base coat, overcoat, or field oxide. The materials of the invention may also be used as any dedicated insulating structure positioned to optimize the effect of the material having a negative coefficient of thermal expansion.

WORKING EXAMPLES

The following examples illustrate some of the benefits of the invention.

Example

A 0.1 micron thick film of $ZrW_2O_8$ was deposited on a single crystal Si substrate by electron beam evaporation of $ZrW_2O_8$ powder target at a power less than 900W. The film composition was determined to be 0.3–1.7 at. % Zr, 23.3–24.7 at. % W, and 75.0 at. % O by Rutherford back scattering spectroscopy. Changes in film stress with changes in temperature were followed by measuring the substrate curvature. Film stress was determined by measuring the change in curvature of the silicon wafer substrate and relating stress to curvature with the Stoney approximation appropriate to equibiaxial loading.

Thermal cycling of the $ZrW_2O_8$ film resulted in permanent changes in film stress and film thermo-mechanical properties, as evidenced by the change in stress-temperature slope following the first cycles to 100° and 200° C. It is not known if the film Young's modulus changed as a result of thermal cycling, and for the purposes of CTE calculation it is assumed to be the bulk value throughout the experiment. Thermal cycling tests on other dielectric films have revealed that changes in both the film CTE and Young's modulus are possible at temperatures as low as 100° and 200° C. Nanoindentation was performed following the thermal cycling experiment to validate the assumed film Young's modulus. The Young's modulus obtained at contact depths of 21 nm or less (~20% or less of the film thickness) was 148±9 GPa. A rule of thumb is that film Young's moduli obtained from nanoindentation experiments at contacts depths up to 20% of the film thickness are independent of the substrate (for compliant films), although the effect of the substrate has been seen at contact depths as shallow as 10% of the film thickness. Therefore the modulus obtained by nanoindentation for this film may be inflated from the true value, which is probably closer to the bulk value of 124 GPa. This can be taken as rough evidence that the modulus did not change drastically during the thermal cycling experiment and most of the change in stress-temperature slope following the first heating half-cycle is due to a change in film CTE.

Changes in film stress were determined by measuring the change in curvature of the Si wafer substrate and relating stress to curvature with the Stoney approximation appropriate to equibiaxial loading:

$$\Delta\sigma_f = \Delta\kappa \frac{E_s t_s^2}{6 t_f},$$

wherein $\Delta\sigma_f$ is the change in film stress associated with the measured change in curvature, $\Delta K$. $E_s$ is the substrate biaxial modulus (180.5 GPa), $t_s$ is the substrate thickness (525 mm), and $t_f$ is the film thickness (0.1 μm).

A commercial curvature measurement tool (KLA-Tencor Corp., San Jose, Calif. FLX Series™) was used, in which the wafer was heated by an enclosed hot plate in an inert environment (nitrogen). Change in curvature was obtained by differentiation of the change in slope of the wafer across its surface. A laser beam detected this change in slope by scanning across the wafer, reflecting off the surface into a compound optical lever, before position detection by a split diode provided a measure of the reflection angle and thus slope. The sample was heated and cooled at 1° C./min.

The thermal cycling experiment consisted of two cycles to 100° C. followed by two cycles to 200° C. The second cycle to 100° C. included a one hour hold at 100° C. and the first cycle to 200° C. included a two hour hold at 200° C.

Depth-sensing indentation was performed at ultra-microscopic scales (nanoindentation) to probe the elastic-plastic contact response of the film using a commercial Triboscope® indenter (Hysitron Inc., Minneapolis, Minn.) with a Berkovich tip. Five indentation experiments were performed to nominal peak loads of 200, 300, and 400 μN. Loading took place over a 5 second time interval, followed by a 10 second hold at peak load, and a 5 second unloading step. The Hysitron indenter is a load-control device, so the displacements were averaged for the load-displacement traces for a given peak load and the resulting unloading curve analyzed using the Oliver-Pharr technique. The Berkovich tip was calibrated to a two-parameter area function by means known to those of skill in the art.

Figure 5A:
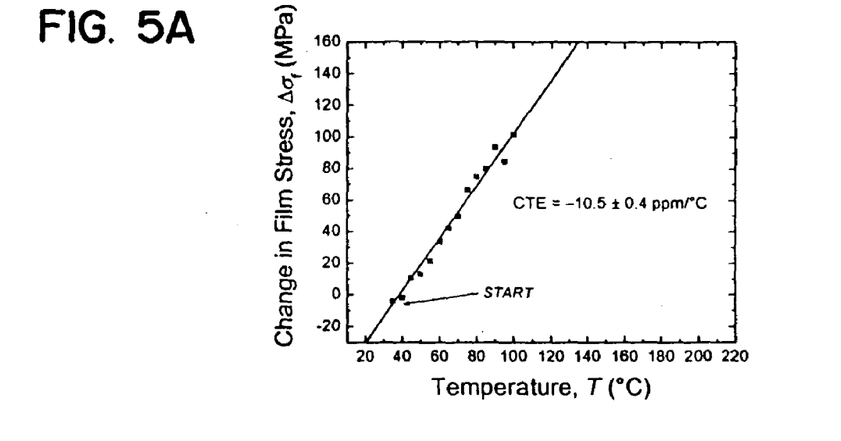
FIGS. 5 and 6 are graphical depictions of data resulting from the working examples.
Figure 5B:
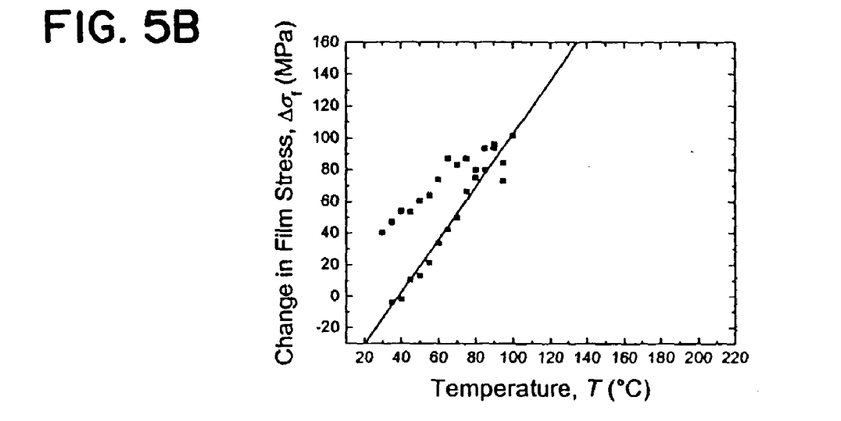
Figure 5C:
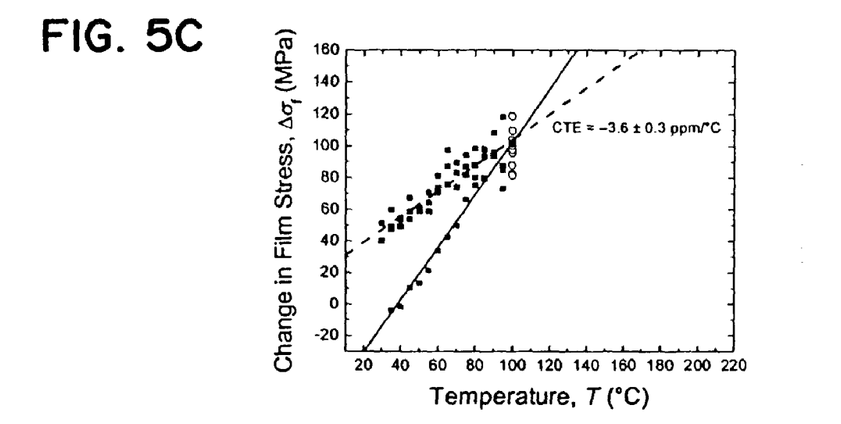

Film stress development with temperature is shown in FIG. 5a for the first heating half-cycle to 100° C. The stress becomes significantly more tensile with increasing temperature. A linear fit to the data is shown as a solid and revealed a slope of 1.662±0.068 MPa/° C. The film CTE was calculated using the following equation appropriate for films on relatively stiff substrates:

$$\Delta\sigma_f = E_f(\alpha_s - \alpha_f)\Delta T,$$

wherein $E_f$ is the film biaxial modulus, $\alpha_s$, is the substrate CTE (2.9 ppm/° C.), $\alpha_f$ is the film CTE, and $\Delta T$ is the change in temperature. Assuming a film Young's modulus of 124 GPa (for α-$ZrW_2O_8$ at 25° C. and assuming a Poisson's Ratio of 0.2), the film CTE was calculated to be −10.5±0.4 ppm/° C. (the film Young's modulus is assumed to be constant throughout the thermal cycling experiment). FIG. 5b includes data points from the first heating and cooling half cycles. The solid line is the same line from FIG. 5a. The slope of the stress-temperature data changed significantly on cooling, resulting in +40 MPa room temperature hysteresis. Tensile stress hysteresis development during the first cycle to an elevated temperature has previously been reported for other dielectric films such as $SiO_X$ and $SiO_XN_y$, and in one case was correlated to the constrained volume change associated with hydrogen, an impurity deposited in the $SiO_X$ film, being driven off at elevated temperatures. The hydrogen content of this $ZrW_2O_8$ film is not known. FIG. 5c shows the results of the subsequent cycle to 100° C. and one hour hold at 100° C. (open circles). The stress change with temperature is approximately the same as seen during the first cooling half-cycle of FIG. 5b. A linear fit to the first cooling half-cycle and subsequent heating and cooling half-cycles is included as a dashed line. The slope of the line is 9.810±9.050 MPa/° C., so the film CTE can be estimated to be −3.6±0.3 ppm/° C. Changes in film thermo-mechanical properties on thermal cycling has been previously reported and may be a result of the same mircostructural or atomic processes that cause the stress hysteresis.

Figure 6A:
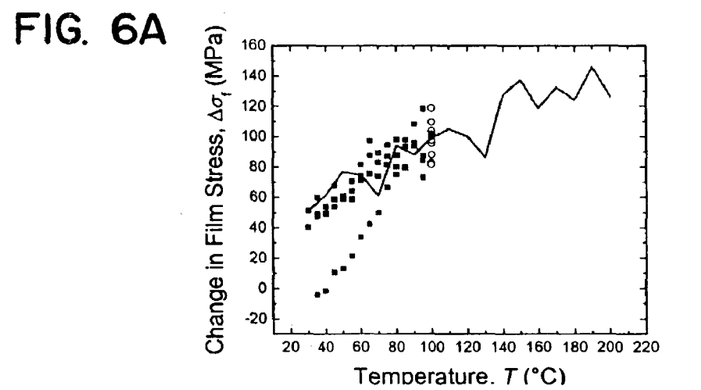
Figure 6B:
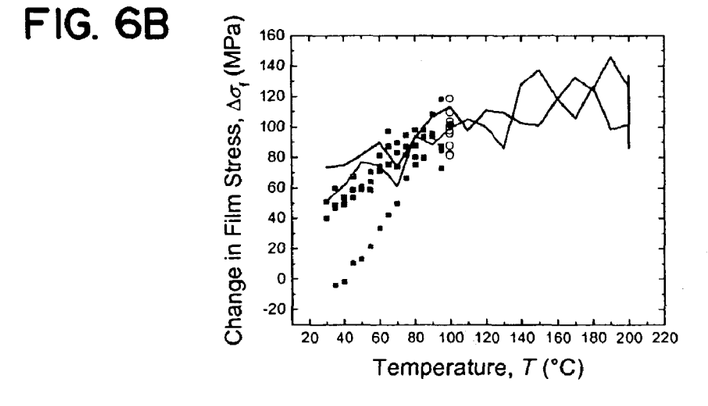
Figure 6C:
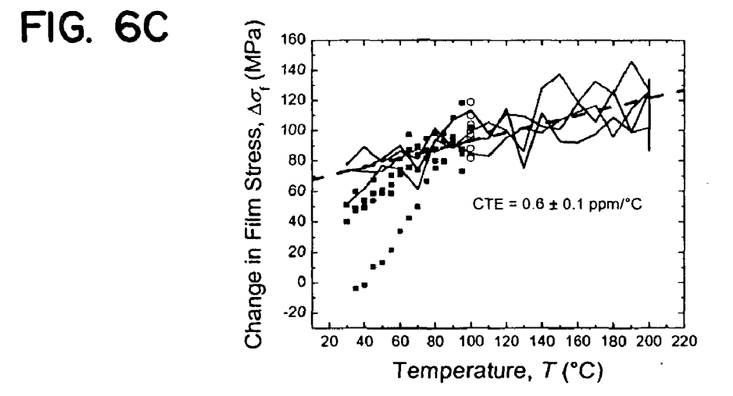

Thermal cycling to 200° C. showed similar results: a room temperature tensile stress hysteresis of 20 MPa was observed on the first cycle resulting from a change in stress-temperature slope on cooling, as shown in FIGS. 6a and 6b. Subsequent cycles to 200° C. resulted in the same stress-temperature slope as that seen on the first cooling half-cycle from 200° C., FIG. 6c. The dashed line in FIG. 6c is a fit to the first cooling half-cycle from 200° C. and the subsequent heating and cooling half-cycles with a slope of 0.283±0.027 MPa/° C. The film CTE associated with this slope is +0.6±0.1 ppm/° C.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A magnetic head comprising:
   a.) a first pole;
   b.) a writer element, said writer element comprising at least one conductive coil, said coil being electrically insulated by a first insulating layer that has a negative coefficient of thermal expansion.

2. The magnetic head of claim 1, wherein said first insulating layer is selected from the group consisting of a crystalline material, an amorphous material, and a polycrystalline material.

3. The magnetic head of claim 2, wherein said first insulating layer comprises a polycrystalline material.

4. The magnetic head of claim 3, wherein said first insulating layer is isotropic in its thermal expansion.

5. The magnetic head of claim 3, wherein said first insulating layer is anisotropic in its thermal expansion properties.

6. The magnetic head of claim 4, wherein said first insulating layer comprises a ceramic.

7. The magnetic head of claim 4, wherein said first insulating layer comprises a ceramic, said ceramic selected from the group consisting of $ZrW_2O_8$, $HfW_2O_8$, $ZrV_2O_7$, $HfV_2O_7$, $ZrV_{(2-x)}P_xO_7$, $ZrW_{(2-x)}Mo_xO_8$ (wherein X<=1.5), and mixtures thereof.

8. The magnetic head of claim 5, wherein said first insulating layer comprises a ceramic, said ceramic selected from the group consisting of $Zr_2PW_2O_{12}$, $Sc_2(WO_4)_3$, $Sc_2(MoO_4)_3$, and mixtures thereof.

9. The magnetic head of claim 1 additionally comprising a second insulating layer positioned adjacent said coils.

10. The magnetic head of claim 9, wherein said second insulating layer comprises a ceramic.

11. The magnetic head of claim 1, wherein said head comprises a plurality of conductive coils.

12. A slider having a magnetic read/write head, said magnetic read/write head comprising:
   a.) a base coat;
   b.) a reader element comprising a transducer;
   c.) a writer element, said writer element comprising at least one conductive coil, said coil being electrically insulated by a first layer that has a negative coefficient of thermal expansion; and
   d.) an overcoat.

13. The slider of claim 12, wherein said reader element is positioned adjacent said base coat.

14. The slider of claim 13, wherein the reader element additionally comprises first and second shields and said transducer is positioned between said first and second shields.

15. The slider of claim 12, wherein said base coat comprises a ceramic which is isotropic in its thermal expansion properties.

16. The slider of claim 12, wherein said writer element has a writer gap.

17. The slider of claim 16, wherein said writer element is positioned adjacent said overcoat.

18. The slider of claim 12, wherein said overcoat comprises ceramic which is isotropic in its thermal expansion properties.

19. The slider of claim 12, wherein said first layer is selected from the group consisting of a crystalline material, an amorphous material, a polycrystalline material.

20. The slider of claim 19, wherein said first layer comprises a polycrystalline material.

21. The slider of claim 20, wherein said first layer is isotropic in its thermal expansion properties.

22. The slider of claim 20, wherein said first layer is anisotropic in its thermal expansion properties.

23. The slider of claim 21, wherein said first layer comprises a ceramic.

24. The slider of claim 21, wherein said first layer comprises a ceramic, said ceramic selected from the group consisting of $ZrW_2O_8$, $HfW_2O_8$, $ZrV_2O_7$, $HfV_2O_7$, $ZrV_{(2-x)}P_xO_7$, $ZrW_{(2-x)}Mo_xO_8$ (wherein X<=1.5), and mixtures thereof.

25. The slider of claim 22, wherein said first layer comprises a ceramic, said ceramic selected from the group consisting of $Zr_2PW_2O_{12}$, $Sc_2(WO_4)_3$, $Sc_2(MoO_4)_3$, and mixtures thereof.

26. The slider of claim 12 additionally comprising a second insulating layer positioned adjacent said coils.

27. The slider of claim 26, wherein said second insulating layer comprises a ceramic.

28. The slider of claim 12, wherein said magnetic read/write head comprises a plurality of coils.

29. A thin film structure comprising:
   a.) a reader element comprising a transducer;
   b.) a writer element comprising at least one conductive coil; and
   c.) at least one insulating element, said insulating element comprising a composition having a negative coefficient of thermal expansion.

30. The thin film structure of claim 29, wherein said insulating element electrically insulates said at least one conductive coil.

31. The thin film structure of claim 29 wherein said writer element comprises a plurality of conductive coils, wherein said insulating element electrically insulates said conductive coils.

32. The thin film structure of claim 31 additionally comprising a second insulating element, said second insulating element is positioned adjacent said conductive coils.

33. The thin film structure of claim 32 wherein said second insulating element comprises a ceramic.

34. The thin film structure of claim 29, wherein said insulating element is positioned adjacent said at least one conductive coil.

35. The thin film structure of claim 29, wherein said insulating element comprises a slider base coat.

36. The thin film structure of claim 29, wherein said insulating element comprises a slider overcoat.

37. The thin film structure of claim 36 wherein said writer element is positioned adjacent said overcoat.

38. The thin film structure of claim 35 wherein said insulating element comprises a polycrystalline material.

39. The thin film structure of claim 38 wherein said insulating element is isotropic in its thermal expansion properties.

40. The thin film structure of claim 38 wherein said insulating element is anisotropic in its thermal expansion properties.

41. The thin film structure of claim 29 wherein at least one layer of said writer element includes said insulating element.

42. The thin film structure of claim 29 wherein at least one layer of said reader element includes said insulating element.

* * * * *